C. REDFIELD.
CIRCUIT CONTROLLING DEVICE.
APPLICATION FILED AUG. 10, 1916.

1,273,092.

Patented July 16, 1918.
6 SHEETS—SHEET 1.

Fig. 1.

WITNESSES
Howard D. Orr.
H. T. Chapman.

Cleveland Redfield, INVENTOR,
BY C. G. Siggers.
ATTORNEY

C. REDFIELD.
CIRCUIT CONTROLLING DEVICE.
APPLICATION FILED AUG. 10, 1916.

1,273,092.

Patented July 16, 1918.
6 SHEETS—SHEET 3.

WITNESSES
Howard D. Orr.
F. T. Chapman

Cleveland Redfield,
INVENTOR,
BY E. G. Siggers
ATTORNEY

C. REDFIELD.
CIRCUIT CONTROLLING DEVICE.
APPLICATION FILED AUG. 10, 1916.

1,273,092.

Patented July 16, 1918.
6 SHEETS—SHEET 4.

WITNESSES
Howard D. Orr.
F. T. Chapman.

Cleveland Redfield,
INVENTOR,

BY
E. G. Siggers.
ATTORNEY

C. REDFIELD.
CIRCUIT CONTROLLING DEVICE.
APPLICATION FILED AUG. 10, 1916.

1,273,092.

Patented July 16, 1918.
6 SHEETS—SHEET 5.

WITNESSES
Howard D. Orr.
F. T. Chapman.

INVENTOR,
Cleveland Redfield,
BY
C. G. Siggers.
ATTORNEY

C. REDFIELD.
CIRCUIT CONTROLLING DEVICE.
APPLICATION FILED AUG. 10, 1916.

1,273,092.

Patented July 16, 1918.
6 SHEETS—SHEET 6.

Cleveland Redfield,
INVENTOR,

WITNESSES

BY

ATTORNEY

UNITED STATES PATENT OFFICE.

CLEVELAND REDFIELD, OF OGDEN, UTAH, ASSIGNOR TO AUTOMATIC CONTROLLER AND MANUFACTURING COMPANY, A CORPORATION OF UTAH.

CIRCUIT-CONTROLLING DEVICE.

1,273,092.   Specification of Letters Patent.   Patented July 16, 1918.

Application filed August 16, 1916. Serial No. 114,240.

*To all whom it may concern:*

Be it known that I, CLEVELAND REDFIELD, a citizen of the United States, residing at Ogden, in the county of Weber and State of Utah, have invented a new and useful Circuit-Controlling Device, of which the following is a specification.

This invention has reference to circuit controlling devices and its object is to provide a means for controlling alternating current circuits with the maintenance of the power factor.

In accordance with the present invention the control of the circuit is through the intermediary of a transformer or transformers by a variation in the magnetic circuit or circuits of the transformer, whereby in the initial position the magnetic flux of the primary of the transformer is constrained to flow in a closed magnetic circuit to the practical exclusion of the secondary coil of the transformer and then as the structure is operated to cause the energization of the secondary of the transformer the magnetic flux is directed through a path including the secondary wiring of the transformer to a progressively greater extent until in the final position the complete magnetic circuit includes both the primary and the secondary of the transformer to the full extent.

The present invention contemplates a structure which on being operated from initial position first closes the main circuit on to the primary coil or coils and then as the operation of the controller progresses, correspondingly changes the magnetic circuit from an initially closed magnetic circuit about the primary coil or coils to a closed magnetic circuit including the secondary coil or coils with the primary coil or coils, the structure being adapted for either single or polyphase currents with a plurality of coils for the polyphase currents. The invention also contemplates the use of means for bringing about the closure of the electric circuit and the shifting of the magnetic circuit in proper manner and order, whether such operating means be of a character permitting it to be controlled from a distance or whether it be of a manually operable type located at the controller box itself, the parts constituting the controller being inclosed in a suitable box or casing, as is customary in electrical apparatus.

The invention will be best understood from a consideration of the following detailed description taken in connection with the accompanying drawings forming part of this specification, with the further understanding that while the drawings show practical forms of the invention, the latter is not confined to any strict conformity with the showing of the drawings, but may be changed and modified so long as such changes and modifications come within the scope of the appended claims.

The transformer-controller is susceptible of use for the control of alternating currents fed to a great variety of translating devices, whether such devices be of inductive or non-inductive type, but for convenience of description it will be considered that the controller is used in connection with alternating current electric motors of either constant or variable speed form. Furthermore, the actuating means for the controller may either be of the manually operable form, such as shown, described and claimed in my application Serial Number 114,239, filed on August 10, 1916, for manually operable controlling device for electric motors, or may be of an electromagnetic distant control, such as shown, described and claimed in my application Serial Number 114,238, filed on August 10, 1916, for controlling device for electric motors. For convenience of description and illustration the means for actuating the controller of the present invention is shown as of the manual type without limitation to the use of such particular type of operating means.

It will also be understood that the present invention is applicable to either monophase or polyphase currents, both arrangements being shown and described herein.

Referring first to Figs. 1, 2, 3 and 4 illustrating a controller for monophase currents, there is shown a controller box comprising a casting 1 forming what constitutes the upper portion of the box in the installed position, such boxes being usually installed in the upright position, and this casting includes legs 2 and 2ª, which in the installed position of the box are in pendent relation to the main part of the casting 1. The casting with the legs 2 and 2ª supports those working parts of the structure that are included within the box. In order to inclose and protect the working parts carried by the casting there is provided a casing 3 made fast to the body of the casting by screws 4 or otherwise, and so constructed that not only are the parts inclosed and protected, but the casing 3 is capable of containing a suitable quantity of oil to immerse switch mechanism within the casing.

Figure 1:
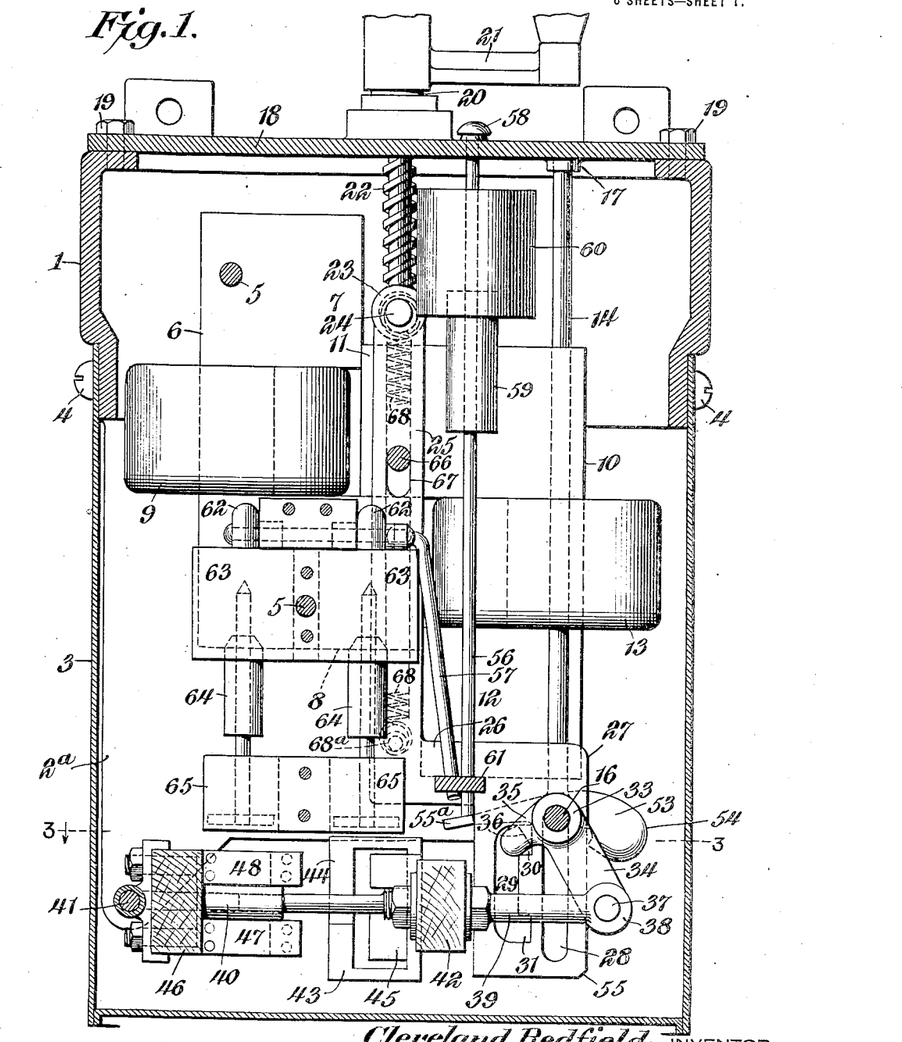
Figure 1 is a vertical section of a controller box showing some of the interior parts in elevation and other parts in section, and illustrating one form of manually operating means for the controller.
Figure 2:
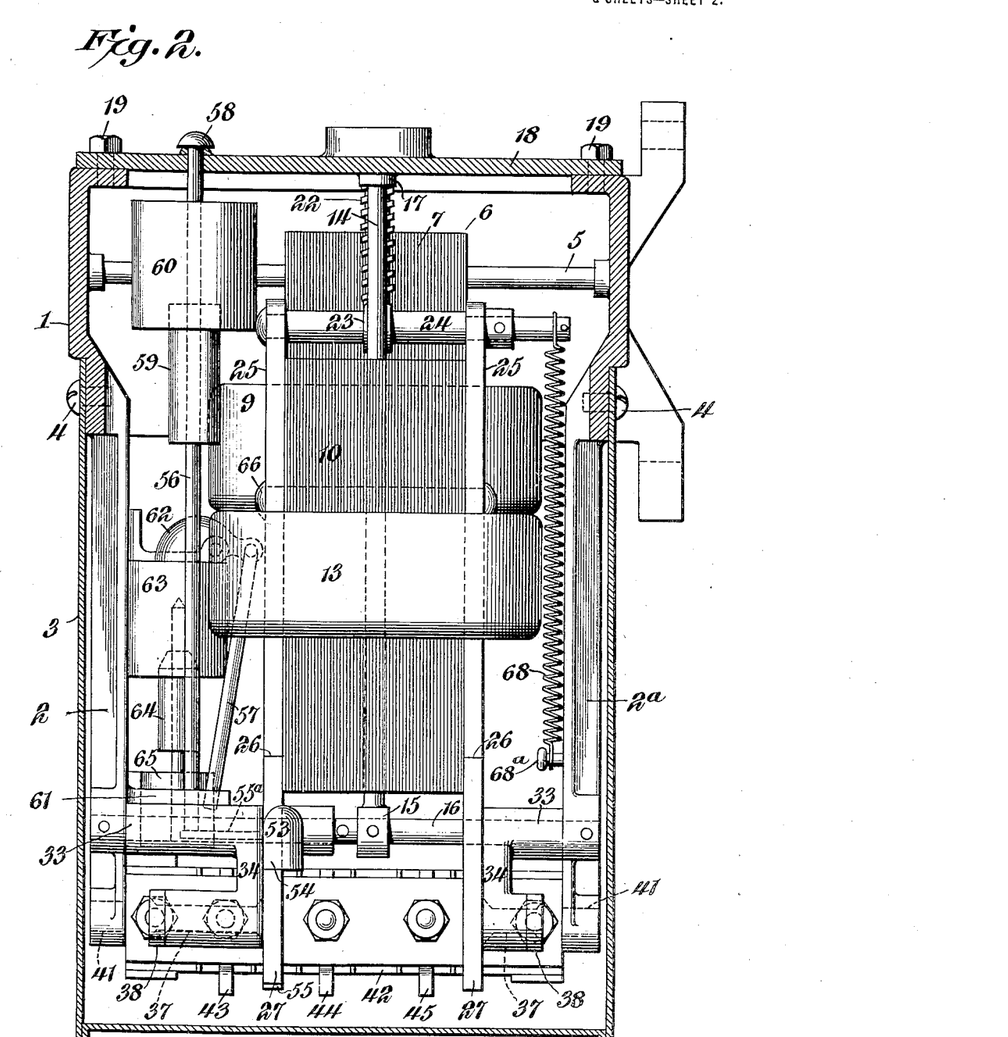
Fig. 2 is a section similar to Fig. 1 but taken at right angles thereto.
Figure 3:
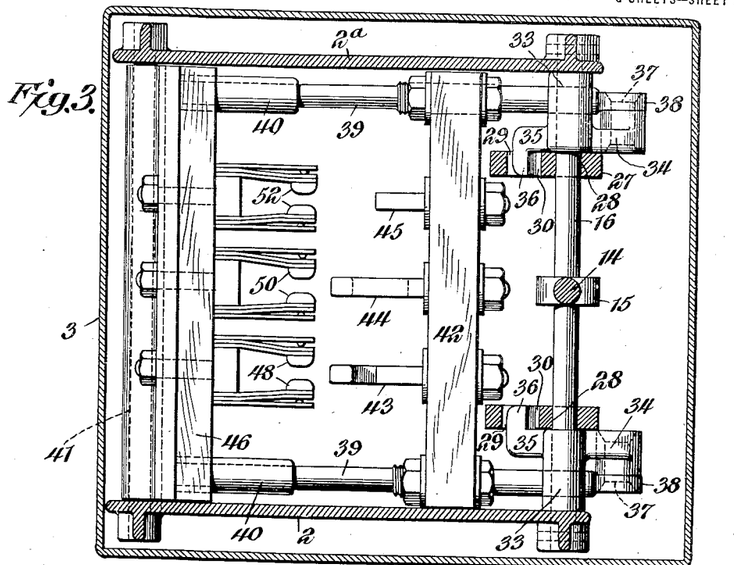
Fig. 3 is a section on the line 3—3 of Fig. 1.

Within the box and mounted upon supporting rods 5, or in any other appropriate manner, is a magnetic yoke 6 having legs 7, 8, respectively, of different lengths with a coil 9 upon the yoke between the legs 7 and 8, such coil constituting the primary or secondary winding of a transformer. Associated with the yoke 6 is another magnetic yoke 10 having legs 11, 12, respectively, of different lengths corresponding to the legs 7 and 8 of the yoke 6. The yoke 10 carries a coil 13 constituting either the secondary or primary winding of the transformer. While the primary and secondary windings of the transformer may have any desired relation, it may be considered that they have a one to one relation of transformation, and for convenience of description the coils 9 and 13 will hereinafter be designated as the primary and secondary windings, respectively, without limitation to such particular arrangement.

The yoke or core structure 6 is fixed within the controller box, while the yoke or core structure 10 is mounted to move lengthwise in the controller box along the core structure 6, and for this purpose the core structure 10 is mounted upon an upright guide rod 14 formed at the lower end with an eye 15 encircling a rod 16 extending transversely of the box and secured at the ends in respective legs 2 and 2ª. The other or upper end of the guide rod 14 is secured in any suitable manner, as by lodgment in a boss 17, on the under face of a cap plate 18, forming the cover of the box and secured thereto by screws 19, or in any other suitable manner permitting the removal of the cap plate or cover 18 when desired. The arrangement is such that the polar end of the leg 7 of the core structure 6, which leg in the particular showing is the shorter leg of the core structure 6, and the polar end of the leg 11 of the core structure 10, which leg is the longer one of the two legs of the core structure 10, are in face to face engagement and the same is true of the polar ends of the legs 8 and 12 of the two core structures constituting the long and short legs, respectively, of the corresponding core structures. Since the controller box in its installed position is upright and the guide rod 14 is also upright, the core structure 10 with the secondary coil 13 moves in an up and down direction and when in the low position, the leg 11 being the longer leg of the core structure 10, rests at its polar end upon the corresponding portion of the leg 8 of the core structure 6, the end portions of the two legs then overlapping, so as to provide magnetic contact of considerable extent. The two core structures are also then in face to face contact between the legs 7 and 11 and the legs 8 and 12. Under these circumstances when current is flowing through the winding 9 the latter is in a closed magnetic circuit, including the legs 7 and 8 of the core structure 6 and the leg 11 of the core structure 10, the latter bridging the gap between the polar end of the leg 7, which it then engages over a relatively small area and the leg 8 which is engaged by the leg 11 over a considerably larger area where the two legs meet. The result is that a relatively small amount of current flows through the coil 9 because of the counter-electromotive force developed therein, and since the magnetic lines of force are practically all diverted into the closed magnetic path about the coil 9 and away from the coil 13, there is no current developed in the coil 13, even though it be at the time closed on a suitable translating device.

Figure 4:
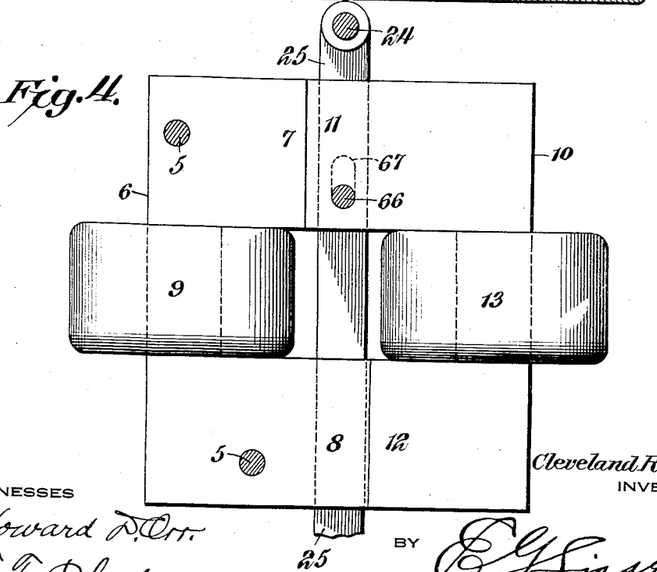
Fig. 4 is a view of the transformer structure shown in Figs. 1 and 2, but illustrating the position of the parts when the magnetic circuit of the transformer is completed through both the primary and secondary coils.

Now if the core structure 10 be moved lengthwise of the core structure 6, so that the leg 11 leaves the leg 8, an air gap is introduced between the legs 11 and 8, while the area of magnetic contact between the legs 7 and 11 and 8 and 12, respectively, is increased. This results in the divergence of lines of force through the core structure 10 into effective relation to the coil 13, with the generation of current in the coil 13, which, however, reacts upon the core structure 10 to confine the lines of force to an extent to the core structure 6, the leg 11 and the air gap between the leg 11 and the leg 8. As the air gap increases, the lines of force are more abundantly directed through the core structure 10 until finally the legs 7 and 11 and the legs 8 and 12 are brought about into coincidence, thus together establishing a magnetic structure through which the lines of force pass in preference to the gap between the legs 7 and 8 by way of the leg 11, and then the flow of current for which the structure is designed is developed in the coil 13 and flows to the translating device assumed to be connected to the coil 13.

The arrangement described admits of the gradually increasing supply of current to the translating device with the maintenance of substantially the full power factor, and if the controller be used for the starting and speeding up of motors, such losses as might occur by the inclusion of the transformer coils in the circuit may be eradicated by providing a switch construction which after the full effect of the transformer is attained cuts the transformer coils out of the circuit and connects the motor directly with the feeding mains. Such an arrangement may be employed, especially with constant speed motors, and certain other devices, but for variable speed motors the variations in speed may be obtained by different adjustments of the transformer magnetic elements, thereby controlling the current reaching the motor.

Where the transformer is ultimately cut out and the motor is directly connected to the power mains, the primary and secondary windings are arranged for one to one transformation, and such transformation may be employed for other arrangements.

In the structure of Fig. 1 and associated figures there is a manually operable arrangement for causing the desired movements of the movable member of the transformer structure to cause the proper control of the current in starting and attaining speed in a motor, especially a constant speed motor, or in supplying current to other types of translating devices where it is desired to avoid undue rush of current on the establishment of the circuit. There is provided on the cap plate or cover 18 a rotatable nut 20 under the control of a crank handle 21. Entering the nut is a screw threaded stem 22 extending into the controller casing and terminating in an eye 23 upon a rod 24 about midway of the length of the latter. Near the ends the rod 24 carries two elongated links 25 dropping to near the bottom of the casing, where each has an angular bend 26 with the bend terminating in a widened extension 27 at an angle to the bend and continued toward the bottom of the casing or box in the same direction as the respective link 25, but in offset relation thereto. Each broad extension 27 has two elongated slots 28, 29, respectively, in substantially parallel relation, the slot 28 being substantially straight throughout, and the slot 29 having terminal angle extensions 30, 31, respectively, at opposite ends. The slot 29 is shorter than the slot 28 for a purpose which will hereinafter appear. Extending through the two slots 28 of the two extensions 27 is the rod 16 secured at the ends in the legs 2 and 2ª near the lower ends of the latter. Mounted on the rod 16 between each extension 27 and the corresponding side of the casing 3 is a hub 33 having two arms 34 and 35 at an angle one to the other with the arm 35 shorter than the arm 34 and terminating in an angle finger 36 arranged to engage in the slot 29 and to enter the angle extremities 30 and 31 thereof. The arms 34 each carry at the end remote from the rod 16 a pivot pin or stud 37 carrying an eye 38 on one end of a rod 39, the other end of which rod telescopes in a sleeve 40 near that side of the casing remote from the arm 34, the sleeve 40 having a pivotal support 41 in a corresponding leg 2 or 2ª. The two rods 39, there being one on each side of the interior of the casing, carry a bar 42 of wood or other suitable insulating material, joining and bracing the rods and serving as a support for contact terminals 43, 44 and 45, respectively, these terminals being hereinafter described with reference to the diagram of Fig. 8. The sleeves 40 are connected to and carry a bar 46 of wood or other insulating material, and this bar carries contact terminals 47 to 52 to be described with reference to Fig. 8 of the drawing, and of which only the contacts 47 and 48 appear in Fig. 1.

Mounted on the rod 16 is a gravity pawl 53 having its heavier end formed with a nose 54 adapted to engage one corner 55 of one of the extensions 27 to lock thereto when the extension is raised for a sufficient distance. The gravity pawl or latch 53 has an arm 55ª extending on the side of the rod 16 remote from the weighted end of the pawl and in the path of two rods 56 and 57, respectively. The rod 56 is an upright rod extending through the cap plate 18 and there provided with a head 58 so that on occasion the rod may be readily manipulated to move the latch 53 and so release the extension 27 engaged thereby. The rod 56 carries a core 59 under the control of a solenoid 60 which, as will hereinafter appear, is in circuit with the leads to the motor or other translating device, so as to hold the rod 58 in the elevated position so long as appropriate current is traversing the solenoid 60, which latter serves as a no-voltage release for the device. The rod 57, which together with the rod 56 passes through a guide finger 61 on an appropriate fixed part of the device, is under the control of gravity rock members 62 supported above solenoids 63 constituting overload solenoids to be hereinafter referred to. The solenoids 63 are provided with cores 64 and dash pots 65, whereby in case of a maintained overload the cores 64 are drawn into the solenoid 63 and the gravity members 62 are rocked to move the rod 57 in a direction to unlatch the pawl 53 from the member 27 with which it may at the time be engaged.

The two links 25 are traversed by a rod 66 carried by the leg 11 and the links 25 where traversed by the rod 66 have elongated slots 67 so that the links may have a limited range of longitudinal movement before affecting the core structure 10.

The screw rod 22 has threads of long pitch so that a plurality of turns of the nut 20 is necessary to move the rod throughout its full length of travel, wherefore in the normal operation of the device at a customary speed of movement of the crank 21, a number of turns, say, about four, of the nut 20 being required to move the rod 22 throughout its full extent of travel, provides sufficient time to start and bring an electric motor up to speed before being subjected to the full line voltage.

A suitable manipulation of the nut 22 in the structure of Fig. 1 causes the updrawing of the screw rod 22 and parts carried thereby until ultimately the latch 53 engages the corner 55 of the extension 27, and thus locks the parts in the lifted position, whereupon the crank handle 21 may be released without fear of the return of the parts to the first position. Such return might be effected by gravity, but is more certainly caused, when the latch 53 is moved to the release position, by a spring 68 conveniently connected at one end to the rod 24 and at the other end to a stud 68ª and put under additional tension when the screw 22 is drawn into the nut 20.

When the parts are in the position shown in Fig. 1 and the crank 21 is properly turned the first effect is to lift the links 25 with their extensions 27. At this time the rod 16 is at the upper end of the slots 28 and the finger 36 is in the upper angle end 30 of the slot 29. The up movement of the links 25 continues until the arm 35 is about horizontal and the arm 34 is about upright, both arms having been initially at an angle to such positions. The rocking of the arm 34 caused by the engagement of the finger 36 in the angle end 30 of the notch 29 brings about a corresponding longitudinal movement of the rods 39 and the switch members carried by the bar 42 supported by these rods until the switch contact 43 engages the contact 47 and the contact 44 bridges the contacts 49 and 50, thereby, as will hereinafter appear, connecting the coil 9 in the main or feeding circuit, and the coil 13 to the motor or other translating device. By this time lost motion between the links 25 and the rod 66 has been taken up, whereupon the rod 66 and the core structure 10 participate in further lifting movement of the links 25, thus carrying the movable member of the magnetic structure toward the position where the legs 7 and 11 about coincide and the legs 8 and 12 about coincide. During a part of this lifting movement the fingers 36 are within the upright portion of the slot 29 and hence are not affected by such slot, but when reaching the angle extremity 31 of the slot, the fingers 36 are again engaged and a further rocking movement of the levers 35 and 34 is brought about with a consequent additional movement of the switch terminals carried by the bar 42 into engagement with others of the switch terminals to cause circuit changes to be described with reference to Fig. 8. When the full travel of the links 25 is attained the latch nose 54 engages the corner 55 of the respective extension 27, thus locking the parts in the elevated position, from which they are released only by the designed operation of the rod 56 for the purpose, the operation of the rod 57 in case of an overload or the drop of the rod 56 in the event of the deënergization of the coil 60, if from any cause current should cease in the motor leads or in the main feeding circuit.

Figure 8:
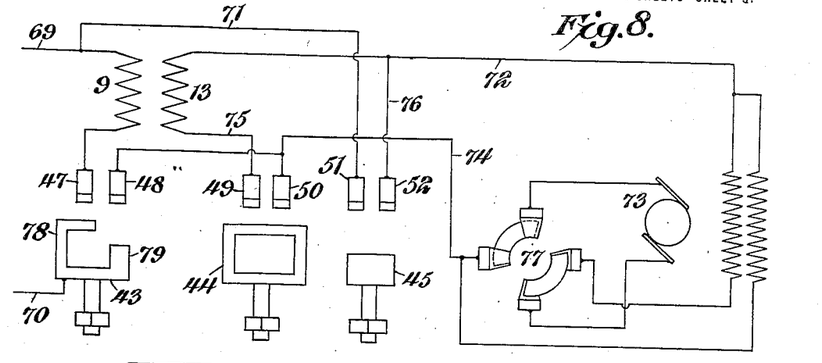
Figs. 8 to 13 are diagrams illustrating different adaptations of the invention.

Considering the diagram of Fig. 8 there are indicated two main line conductors 69, 70, respectively, which are assumed to be charged with monophase currents. One terminal of the primary coil 9 is connected to the conductor 69 and the other terminal of the primary coil or winding 9 is connected to the contact 47 of the switch within the controller box. The main line conductor 69 is connected by a branch conductor 71 to the contact terminal 51. The secondary coil 13 is connected on one side to a conductor 72 leading to an electric motor 73 shown as of the variable speed type, with a compensating field winding connected across the leads to prevent excessively high speed of the motor when running light. The other side of the motor 73 is connected by a conductor 74 to the contact terminal 50 and also to the contact terminal 48. The other terminal of the coil or winding 13 is connected by a conductor 75 to the switch contact 49. Branched from the conductor 72 is another conductor 76 connected to the switch terminal 52.

For purposes of readily controlling the direction of speed of the motor 73, a reversing switch 77 is provided, but being of ordinary construction needs no special description.

The movable switch terminal 43 is provided with two contact portions 78 and 79, respectively, arranged to engage the contact terminals 47 and 48 in order, so that the end 78 of the contact 43 engages the contact 47 before the end 79 engages the terminal 48. The contact terminal 44 is a bridging contact for the terminals 49 and 50 and is so related to the end 78 of the contact 43 as to bridge the contacts 49 and 50 simultaneously with the engagement of the end 78 with the terminal 47. The contact 45 is also a bridging contact for the terminals 51 and 52 and is so positioned as to bridge the contacts 51 and 52 simultaneously with the engagement of the end 79 of the contact 43 with the contact terminal 48.

On the first or preliminary movement of the manipulating crank 21, which results only in a movement of the switch within the controller box, the main line conductor 70 is connected by means of the end 78 of the terminal 43 with the terminal 47, thus including the primary winding 9 in the main circuit. At the same time the terminal 44 is brought into bridging relation with the terminals 49 and 50, thus closing the secondary winding 13 on to the motor 73. Under the conditions thus established and before there is any change in the magnetic circuit of the transformer the reactance of the winding 9 is sufficient to largely choke back current tending to flow through the coil 9, while such magnetic lines of force which may be generated at the time find an easier path through the engaging portions of the legs 11, 7 and 8 of the magnetic parts of the transformer than through that portion of the yoke 10 which would cause generation of currents in the coil 13.

During the next phase in the movement of the manipulating means the switch within the transformer remains quiescent, thus maintaining the circuit conditions already established but effecting no others, while at the same time the core structure 10 is being moved with relation to the core structure 6 to establish an air gap between the previously meeting portions of the legs 8 and 11, wherefore there is produced increasing magnetic reluctance to the magnetic lines of force from the leg 7 through the leg 11 to the leg 8 and at the same time correspondingly establishing a better path for the lines of force through the core structure 10 into effective relation with the coil or winding 13. Current is therefore generated in the winding 13 to an increasing extent with the reactance of the winding 13 tending to maintain the ordinary path of the lines of force despite the increasing air gap between the legs 8 and 11. However, as the air gap increases the magnetic lines of force are more and more diverted into active relation to the winding 13 until finally they have their full effect upon the winding 13 when the legs 7 and 11 about coincide and the legs 8 and 12 about coincide, at which time the full demand of the motor which has previously started and has accelerated in speed because of the increasing amount of current fed to it, is receiving all the current it demands and running conditions are fully established.

Before the upper limit of travel of the links 25 is reached, and before the parts are locked by the latch 53 in the position to which they are ultimately moved, the end 31 of the slot 29 is brought into engagement with the finger 36, thus further rocking the arms 35 and 34 to move the switch contacts 43, 44 and 45 still farther, thus breaking the circuit between the contact 43 by way of the end 78 with the contact 47 and establishing the circuit between the end 79 and contact 48. The contact 44 is simultaneously moved beyond the contacts 49 and 50, thus breaking the bridge connection therebetween, while the contact 45 is moved into bridging relation with the contacts 51 and 52. Now, the circuit is established from the main conductors 69 by way of conductor 71 to the contact 51, thence through the bridging contact 45 to the contact 52, and by way of the conductors 76 and 72 to the motor 73, returning by way of the conductor 74 to the contact 48 and by the contact 43 to the other main conductor 70, whereupon the transformer is completely cut out of the circuit and all transformer losses are thereby eliminated.

Figure 9:
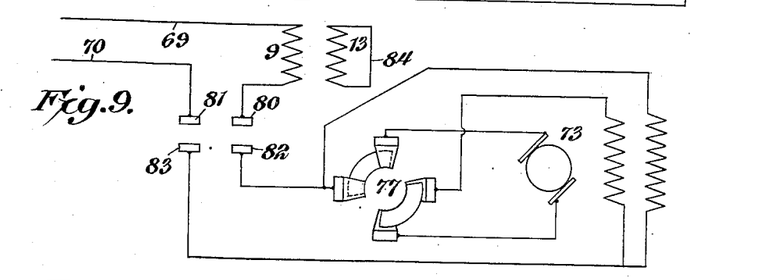

It is not necessary that the effects of the controller structure be brought about by utilizing the secondary coil for feeding the motor, since the arrangement indicated in Fig. 9 may be employed where the primary coil 9 is connected on one side as before to one main 69, while the other side of the coil 9 is connected to a contact terminal 80. The other main conductor 70 is connected to another contact terminal 81. Other contact terminals 82 and 83 are connected to respective terminals of the motor 73, while the secondary winding 13 of the transformer is permanently short-circuited as by a conductor 84. The effect of the arrangement of Fig. 9 is to cause the reactance of the coil 9 to hold back a rush of current to the motor on the primary closing of the circuit and the gradual cutting down of such reactance by the secondary coil until practically the only resistance to the passage of current to the motor is the ohmic resistance of the coil 9, which ohmic resistance may be made negligibly small.

Figure 10:
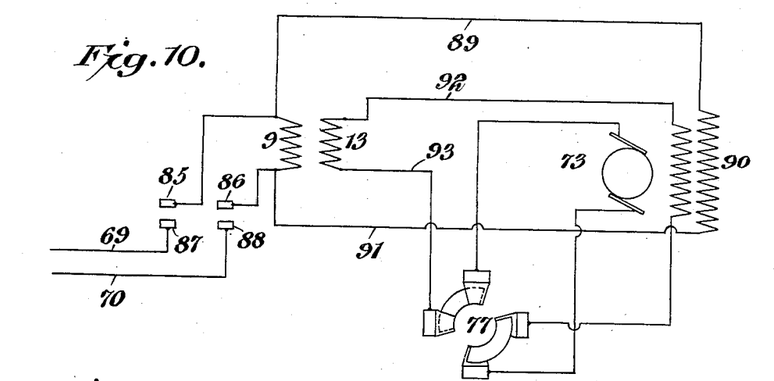

In Fig. 10 there is indicated still another arrangement which may be employed. The primary coil 9 is connected to switch contacts 85, 86, respectively, while the main line conductors 69 and 70 are connected to other contact terminals 87, 88, respectively. One side of the coil 9 is connected by a conductor 89 to a compensating coil 90 in the field of the motor 73 and the other side of this coil is connected by a conductor 91 to the other side of the primary winding 9. The secondary winding 13 is connected on respectively opposite sides by conductors 92 and 93 to the terminals of the motor with which latter there is associated a reversing switch 77.

Figure 5:
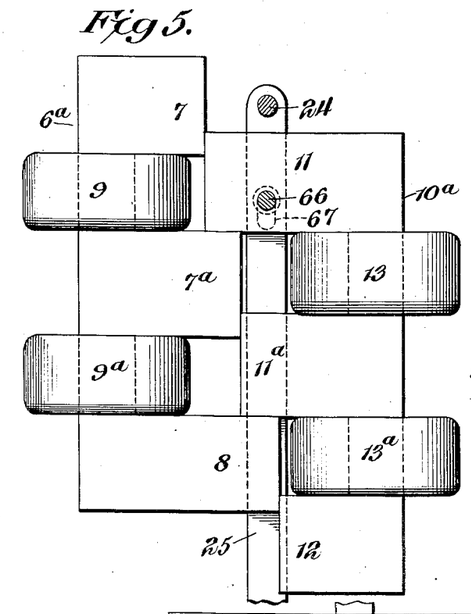
Fig. 5 is an elevation, with some parts in section, of the transformer part of the controller arranged for multiphase currents.
Figure 6:
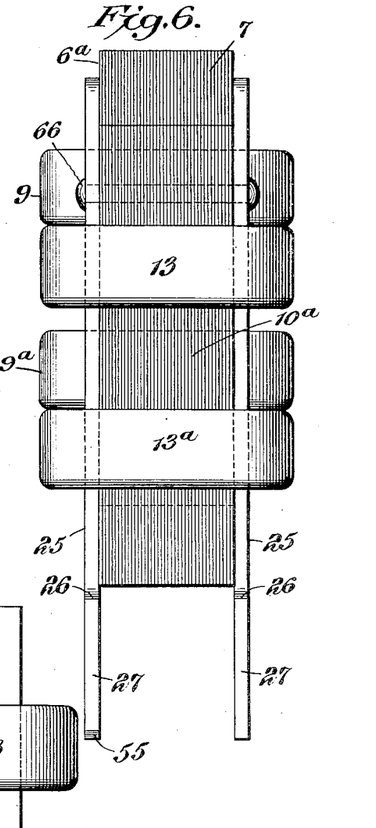
Fig. 6 shows the structure of Fig. 5 as seen from the right hand side thereof.
Figure 7:
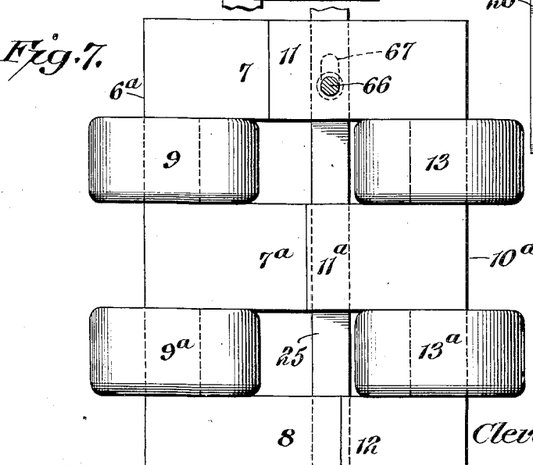
Fig. 7 is a view similar to Fig. 4 but showing the structure of Figs. 5 and 6.

So far the controller has been described in its adaptations of monophase circuits. It is equally applicable to polyphase circuits with, of course, appropriate structural changes. In Figs. 5, 6 and 7 and in the diagrams of Figs. 11, 12 and 13 the polyphase structure and circuit connections are illustrated.

Since the operating mechanism for the magnetic circuit and the switch are the same as in the structure of Fig. 1 and associated figures, it is deemed unnecessary to illustrate these parts in the polyphase system. Considering the structure of Figs. 5 and 6 there are two core structures 6ª and 10ª, respectively, with primary coils 9 and 9ª and secondary coils 13 and 13ª. The coils 9 and 9ª are separated by a leg 7ª of the magnetic circuit, while the legs 7 and 8 are the same as before. In the magnetic structure 10ª the two coils 13 and 13ª are separated by a leg 11ª, the other legs 11 and 12 remaining as before. The only difference is that the leg 11 makes relatively extended side contact with the leg 7ª and the leg 11ª makes relatively extended side contact with the leg 8, wherefore the coil 9 when the parts are in the initial position is provided with a magnetic circuit through the core structure 6ª, leg 7, leg 11 and leg 7ª, while the coil or winding 9ª has a closed magnetic path about it by way of the leg 7ª, leg 11ª and leg 8.

The actions of the structures being the same with respect to the controlling feature whether the current be monophase or polyphase, an extended description of the action of the structure of Figs. 5, 6 and 7 is deemed unnecessary.

Figure 11:
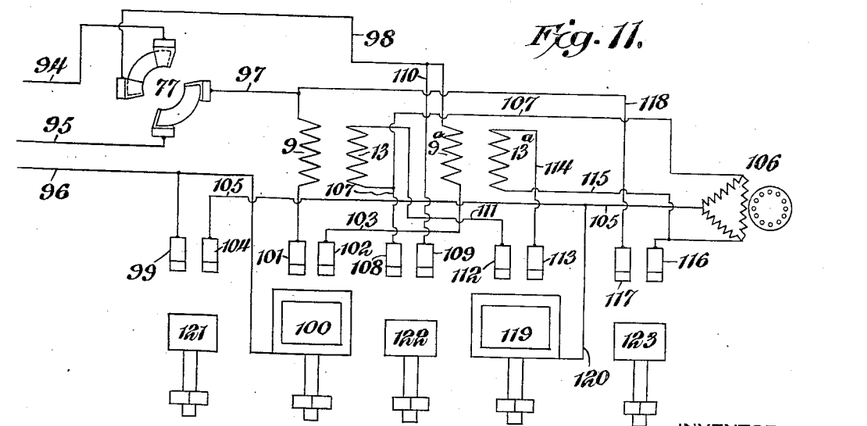

In Fig. 11 there is shown a wiring diagram for the controller of Figs. 5 and 6. There are feeding mains 94, 95 and 96 with the feeding mains 94 and 95 including a reversing switch 77. One terminal of the reversing switch is connected by a conductor 97 to the primary winding 9, while the other side of the reversing switch is connected by a conductor 98 to the primary winding 9ª. The conductor 96 is shown as connected to a contact terminal 99 and to a bridging switch terminal 100, the latter being similar to the switch terminal 44 already described. That side of the winding 9 remote from the conductor 97 is connected to a switch terminal 101 in the path of the switch terminal or contact 100. Associated with the contact 101 is another contact 102 connected by a conductor 103 to that side of the winding 9ª remote from the conductor 98. Associated with the contact 99 is another contact 104 connected by a conductor 105 to one terminal of the field of a motor 106, the latter being shown as of the squirrel cage type. The secondary winding 13 is connected on one side by a conductor 107 to a contact terminal 108 with which is associated another contact terminal 109 connected by a conductor 110 to the conductor 98 already referred to. The conductor 107 is branched to another terminal of the field of the motor 106. The other side of the secondary coil 13 is connected by a conductor 111 to a contact terminal 112 with which is associated another contact terminal 113 connected by a conductor 114 to one side of the other secondary coil or winding 13ª, while the other side of the winding 13ª is connected by a conductor 115 to the remaining terminal of the field of the motor 106 and also to a contact 116, with which is associated a contact 117 connected by a conductor 118 to the conductor 97. Arranged to bridge the contacts 112 and 113 is a bridging switch terminal 119 connected by a conductor 120 to the conductor 105. Other bridging contacts 121, 122 and 123 are arranged to bridge the pair of contacts 99 and 104, the pair of contacts 108 and 109 and the pair of contacts 116 and 117, respectively, but the arrangement is such that the contacts 121, 122 and 123 become active later than the contacts 100 and 119, and after the latter have again broken contact with the contacts 101 and 102 and the contacts 112 and 113 that they control.

Fig. 11 is similar to Fig. 8 except that it provides for a polyphase instead of a single phase motor. The first switch movement, bridges contacts 101, 102 by way of contact 100 and bridges contacts 112, 113 by way of contact 119, thereby connecting the primary windings across the line in open delta connection and connecting the secondary windings to the motor in open delta.

The second switch movement opens the primary and secondary circuits and connects the motor to line independent of said windings thereby eliminating transformer losses.

Figure 12:
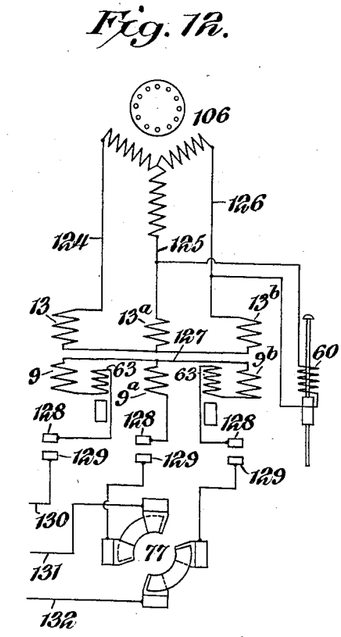

In Fig. 12 there are three primary coils 9, 9ª and 9ᵇ and corresponding with these are three secondary coils 13, 13ª and 13ᵇ, the latter being connected up to the respective terminals of a motor 106 by respective conductors 124, 125 and 126. The primary coils 9, 9ª and 9ᵇ are connected together on one side by a conductor 127, while the other terminals of these coils are connected to respective switch contacts 128 in the path of other contacts 129 connected to respective main line conductors 130, 131 and 132 assumed to be carrying polyphase currents. Overload solenoids 63 are imposed between the primary coils 9 and 9ᵇ and the contacts 128. The conductors 131 and 132 are connected to the respective contacts 129 through a reversing or pole-changing switch 77. Branched between the conductors 125 and 126 is a no-voltage coil 60. In the arrangement of Fig. 12 the motor is fed inductively from the mains 130, 131 and 132 through the primary and secondary coils of the controller.

Figure 13:
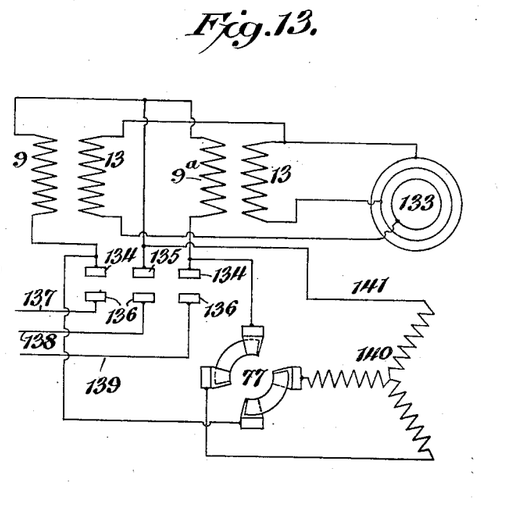

In the wiring diagram of Fig. 13 there are shown primary coils 9 and 9ª and secondary coils 13 and 13ª, the latter being coupled up to an armature 133 simply represented in the diagram by collector rings, and this armature is fed inductively from the coils 9 and 9ª. One side of the coils 9 and 9ª are connected to respective contacts 134, while the other sides of the coils 9 and 9ª are connected to a contact 135, the three contacts being in the path of switch contacts 136 connected to respective mains 137, 138 and 139. The contacts 134 and 135 are connected to a field winding 140, which together with the armature 33 will constitute a motor 141 and included in appropriate ones of the connections to the armature is a reversing or pole-changing switch 77.

The various wiring diagrams indicate that the controller in its different forms is susceptible of a great variety of uses and may be connected up in various ways not only in the manners shown, but in other manners.

What is claimed is:—

1. A means for controlling alternating currents, comprising a transformer having primary and secondary windings with relatively movable magnetic cores individual thereto, said cores having polar extremities and the range of movements being sufficient and in a direction to move a core from an initial position having one polar extremity of one magnetic core bridging the gap between polar extremities of the other core to a position where the polar extremities of both cores register.

2. A means for controlling alternating electric currents, comprising a transformer having primary and secondary windings, separate magnetic structures for the primary and secondary sides of the transformer, each comprising a core portion and polar extensions with the latter directed toward the polar extensions of the other, and means for adjusting the magnetic structures relative one to the other in the direction of the length of the magnetic structures, and with the polar extensions of greater width than the distance of their separation, whereby the magnetic structures may be moved from one position confining the path of the lines of force to the primary side of the transformer by one of the polar extensions thereof, with a polar extension of the magnetic structure of the secondary side bridging two adjacent polar extensions of the magnetic structure on the primary side of the transformer, to another position providing a path for the lines of force including both the primary and the secondary sides of the transformer.

3. A controller for alternating electric currents, comprising a transformer with primary and secondary windings, and magnetic structures individual thereto each including a core and polar extensions of different lengths, with the polar extensions of each core separated one from the other by a distance less than the thickness of the polar extension, and said structures being slidable along and with relation to each other in the direction of the lengths of the cores and having an initial position providing a path for the lines of force confined to the primary side, and another position with the path of the lines of force including both the primary and secondary sides of the transformer, and other intermediate positions, the difference in lengths of the polar extensions causing side contact thereof when the magnetic structures are in the initial position.

4. A controller for alternating electric currents, comprising a transformer having primary and secondary windings with magnetic structures individual thereto, one structure being movable on the other and having parts movable into and out of contact to provide a closed magnetic circuit about the primary side of the transformer, a variable air gap in such magnetic circuit, and another magnetic circuit about both the primary and secondary sides of the transformer controllable by the variation of the said air gap.

5. A means for controlling alternating electric currents. comprising a transformer with primary and secondary windings, magnetic structures individual to the primary and secondary sides of the transformer and slidable one on the other and also provided with portions movable into and out of side engagement in the direction of sliding, whereby the path of magnetic lines of force may be confined to the primary side of the transformer and gradually diverted therefrom to include both the primary and secondary sides of the transformer.

6. A means for controlling alternating electric currents, comprising a transformer with primary and secondary windings, magnetic structures individual to the primary and secondary sides of the transformer, one of the magnetic structures being fixed and the other movable on the fixed structure, the magnetic structures having polar extensions with end contact and movable into and out of side contact, whereby to produce a closed or substantially closed magnetic circuit in one position of the parts to include one of the electrical sides of the transformer, and another magnetic circuit in another position of the parts to include both of the electrical sides of the transformer.

7. A means for controlling alternating electric currents, comprising a transformer with primary and secondary windings, magnetic structures individual to the primary and secondary sides of the transformer, one of the magnetic structures being fixed and the other movable on the fixed structure, the magnetic structures having polar extensions with end contact and movable into and out of side contact, whereby to produce a closed or substantially closed magnetic circuit in one position of the parts to include one of the electrical sides of the transformer, and another magnetic circuit in another position of the parts to include both of the electrical sides of the transformer, and means for causing actuation of the movable magnetic structure in extent and during a time period to supply the demand for current without undue rush of current.

8. A controller for alternating electric currents, comprising a transformer having primary and secondary windings, magnetic structures individual to the respective primary and secondary windings and each having polar extremities of different lengths, whereby certain of the polar extremities may overlap, and means for producing relative movement of the magnetic structures to cause the overlapping polar extremities to have side engagement or to move apart while maintaining closed magnetic conditions between the two magnetic structures.

9. A controller for alternating electric currents, comprising a transformer having primary and secondary windings and magnetic structures for and individual to the windings, each structure having polar extensions corresponding to those of the other with the polar extensions of each magnetic structure of unequal length and with those of greater length engaging opposed polar extensions of shorter length and with certain of the polar extensions adapted to be brought into side engagement.

10. A controller for alternating electric currents, comprising a transformer having primary and secondary windings and magnetic structures for and individual to the windings, each structure having polar extensions corresponding to those of the other with the polar extensions of each magnetic structure of unequal length and with those of greater length engaging opposed polar extensions of shorter length and with certain of the polar extensions adapted to be brought into side engagement, said structure also having means for causing the separation of the polar extensions initially in side engagement without separating end engagement of the polar extension of the magnetic structure, whereby one electrical side of the transformer may be included in a closed magnetic circuit to the exclusion of the other side of the transformer or both sides of the transformer may be included in a closed magnetic circuit.

11. A controller for alternating electric currents, comprising a transformer having primary and secondary windings with magnetic structures individual thereto and each provided with a plurality of polar extensions of unequal length with a longer polar extension of one magnetic structure opposed to a shorter polar extension of the other magnetic structure, the longer polar extensions overlapping and in end to end contact with the corresponding shorter polar extensions, and means for causing relative movement of the magnetic structures with the polar extensions in end to end contact to bring the longer extensions into side contact and to move one away from the other to provide an air gap between them.

12. A controller for alternating electric currents, comprising a transformer having primary and secondary windings with magnetic structures individual thereto and each provided with a plurality of polar extensions of unequal length with a longer polar extension of one magnetic structure opposed to a shorter polar extension of the other magnetic structure, the longer polar extensions overlapping and in end to end contact with the corresponding shorter polar extensions, and means for causing relative movement of the magnetic structures with the polar extensions in end to end contact to bring the longer extensions into side contact and to move one away from the other to provide an air gap between them, the last-named means having an extent of movement in lost-motion relation to the magnetic structure controlled by it.

13. A controller for alternating electric currents, comprising a transformer having primary and secondary windings with magnetic structures individual thereto and each provided with a plurality of polar extensions of unequal length with a longer polar extension of one magnetic structure opposed to a shorter polar extension of the other magnetic structure, the longer polar extensions overlapping and in end to end contact with the corresponding shorter polar extensions, and means for causing relative movement of the magnetic structures with the polar extensions in end to end contact to bring the longer extensions into side contact and to move one away from the other to provide an air gap between them, the last-named means having an extent of movement in lost-motion relation to the magnetic structure controlled by it, and the controller being provided with switch mechanism adapted to close an electric circuit within the range of movement provided by the lost motion.

14. A controller for alternating electric currents, comprising a transformer having primary and secondary windings with magnetic structures individual thereto and movable one with relation to the other for establishing a magnetic circuit including the primary side only of the transformer and another magnetic circuit including both sides of the transformer, means for moving one magnetic structure with relation to the other to establish the stated magnetic circuits, said means having an extent of lost-motion with respect to the magnetic structure controlled thereby, and an electric switch connected to and controlling the transformer and connected to the actuating means for the magnetic structure to close an electric circuit during such lost motion movement, the actuating means and the switch also having lost motion connections active after the first-named lost motion has been taken up.

15. A controller for alternating electric currents, comprising a transformer having primary and secondary windings with magnetic structures individual thereto one movable on the other and also having parts movable into and out of magnetic relation to provide different closed magnetic circuits, and a variable air gap, means for actuating the movable magnetic structure with connections thereto providing an extent of lost motion, an electric switch having different active positions, and connections between the switch and the actuating means for the movable magnetic structure having positive and lost motion connections.

16. A controller for alternating electric currents, comprising a transformer having primary and secondary windings with magnetic structures individual thereto one movable on the other and also having parts movable into and out of magnetic relation to provide different closed magnetic circuits and a variable air gap, means for actuating the movable magnetic structure with connections thereto providing an extent of lost motion, an electric switch having different active positions, and connections between the switch and the actuating means for the movable magnetic structure having positive and lost motion movements, said connections between the actuating means and the switch having the positive acting parts at the terminals of the lost motion part with one active part timed to actuate the switch during the taking up of the lost motion between the actuating means and the magnetic structure and the second positive acting connection becoming active at the other end of the lost motion part of the connections between the switch and actuating means.

17. A controller for alternating electric currents, comprising a transformer having primary and secondary windings with magnetic structures individual thereto and one movable on the other and also provided with parts movable into and out of the magnetic contact, and means for actuating the movable magnetic structure, comprising a screw-threaded stem and a manually operable device acting on the stem to propel the latter.

18. A controller for alternating electric currents, comprising a transformer having primary and secondary windings with magnetic structures individual thereto and one movable on the other and also provided with parts movable into and out of the magnetic contact, and means for actuating the movable magnetic structure, comprising a screw-threaded stem and a manually operable device acting on the stem to propel the latter, the manually operable means and the magnetic structure controlled thereby having lost motion connections of an extent to permit a limited operation of the manual device before acting upon the magnetic structure controlled thereby.

19. A controller for alternating electric currents, comprising a transformer having primary and secondary windings and magnetic structures individual thereto with one structure movable on the other and having parts movable with relation one to the other for varying the magnetic reluctance of the magnetic structures and to provide closed paths for the magnetic lines of force, means for actuating the movable magnetic structure, and switch means for controlling electric circuits through the transformer and in turn controlled by the means for actuating the movable magnetic structure.

20. A controller for alternating electric currents, comprising a transformer having primary and secondary windings and magnetic structures individual thereto with one structure movable on the other and having parts movable with relation one to the other for varying the magnetic reluctance of the magnetic structures and to provide closed paths for the magnetic lines of force, means for actuating the movable magnetic structure, and switch means for controlling electric circuits through the transformer and in turn controlled by the means for actuating the movable magnetic structure, the controller also being provided with means for holding the parts in active position, no-voltage release means and over-load release means.

21. A controller for alternating electric currents, comprising a suitable box or closure, a transformer lodged therein and comprising primary and secondary windings with magnetic structures individual thereto and having one of the magnetic structures movable along the other and said magnetic structures having parts movable into and out of side engagement with other parts maintaining end to end engagement to provide variable magnetic paths for the magnetic lines of force, a switch structure within the box, and actuating means for the movable magnetic structure having connections thereto and to the switch for the actuation of both.

22. A controller for alternating electric currents, comprising a suitable box or closure, a transformer lodged therein and comprising primary and secondary windings with magnetic structures individual thereto and having one of the magnetic structures movable along the other and said magnetic structures having parts movable into and out of side engagement with other parts maintaining end to end engagement to provide variable magnetic paths for the magnetic lines of force, a switch structure within the box, and actuating means for the movable magnetic structure having connections thereto and to the switch for the actuation of both, said actuating means having lost motion connections with the magnetic structure controlled thereby and with the switch and lost motion connections timed in action to cause a preliminary movement of the switch, a movement of the movable magnetic structure and a second movement of the switch in the order named.

23. A controller for alternating electric currents, comprising a suitable box or closure, a transformer lodged therein and comprising primary and secondary windings with magnetic structures individual thereto and having one of the magnetic structures movable along the other and said magnetic structures having parts movable into and out of side engagement with other parts maintaining end to end engagement to provide variable magnetic paths for the magnetic lines of force, a switch structure within the box, and actuating means for the movable magnetic structure having connections thereto and to the switch for the actuation of both, said actuating means having lost motion connections with the magnetic structure controlled thereby and with the switch and lost motion means timed in action to cause a preliminary movement of the switch, a movement of the movable magnetic structure, and a second movement of the switch in the order named, and said box containing no-voltage and over-load release means for the controller.

24. A controller for alternating electric currents, comprising a transformer, primary and secondary coils, and magnetic structures individual thereto with one magnetic structure movable with relation to the other to vary the magnetic conditions of the transformer, actuating means for the movable magnetic structure having a bias in one direction, an electric switch, positive and lost motion connections between the actuating means and the switch, a latch structure for holding the parts in the position to which they are moved by the actuating means and in opposition to the bias thereof, and means for causing the movement of the latch to release position for the return of the parts to the first position under the normal bias thereof.

25. A controller for alternating electric currents, comprising a suitable box, a transformer therein having primary and secondary windings with magnetic structures individual thereto and one structure being movable with respect to the other structure to vary the magnetic conditions of the transformer, a switch within the box, actuating means for the movable magnetic structure having manually operable means exterior to the box for moving the actuating means, said actuating means having lost motion connections to the movable magnetic structure, and lost motion connections to the switch and also having means for imparting to it a normal bias in one direction, and means for holding the parts in a position to which they are moved by the manually operable means.

26. A controller for alternating electric currents, comprising a suitable box, a transformer therein having primary and secondary windings with magnetic structures individual thereto and one structure movable with respect to the other structure to vary the magnetic conditions of the transformer, a switch within the box, actuating means for the movable magnetic structure having manually operable means exterior to the box for moving the actuating means, said actuating means having lost motion connections to the movable magnetic structure, and lost motion connections to the switch and also having means for imparting to it a normal bias in one direction, and means for holding the parts in a position to which they are moved by the manually operable means, said holding means comprising a latch and the controller being provided with means for moving the latch to the unlatched position.

27. A controller for alternating electric currents, comprising a suitable box, a transformer therein having primary and secondary windings with magnetic structures individual thereto and one structure being movable with respect to the other structure to vary the magnetic conditions of the transformer, a switch within the box, actuating means for the movable magnetic structure having manually operable means exterior to the box for moving the actuating means, said actuating means having lost motion connections to the movable magnetic structure, and lost motion connections to the switch and also having means for imparting to it a normal bias in one direction, and means for holding the parts in a position to which they are moved by the manually operable means, said holding means comprising a latch and the controller being provided with means for moving the latch to the unlatched position, said last-named means comprising manual means, no-voltage means and over-load means.

In testimony, that I claim the foregoing as my own, I have hereto affixed my signature in the presence of two witnesses.

CLEVELAND REDFIELD.

Witnesses:
 MARIE L. LEWIS,
 JOHN H. SIGGERS.